United States Patent Office.

HANS REISERT, OF COLOGNE, GERMANY.

PROCESS OF REMOVING SULFURIC ACID FROM WATER.

SPECIFICATION forming part of Letters Patent No. 713,800, dated November 18, 1902.

Application filed February 3, 1902. Serial No. 92,465. (No specimens.)

*To all whom it may concern:*

Be it known that I, HANS REISERT, a subject of the King of Prussia, German Emperor, residing at Cologne-on-the-Rhine, in the Province of the Rhine, Kingdom of Prussia, German Empire, have invented a new and useful Process for the Removal of Sulfuric Acid from Water, of which the following is a specification.

The method of removing free sulfuric acid from water containing same by passing the water over witherite—*i. e.*, natural barium carbonate—is already known. So far as this process has become known, it is a question of passing the water over rather large pieces of witherite along a considerable distance, so that contact takes place to a sufficient extent to neutralize the free sulfuric acid contained in the water, the basic ferric sulfate being also supposed to separate out during the process. On the other hand, the employment of barium carbonate as a means for removing the plaster-of-paris from the water used for feeding boilers, and thereby preventing incrustation, is likewise already known. The process first mentioned can only remove free sulfuric acid, and, indeed, hitherto nothing more was intended, while the sulfuric acid, in combination with potassium, sodium, calcium, and magnesium, always remains in the water. The second process has against it the facts that the barium carbonate is insoluble and that there is difficulty in its admixture, as it is impossible to remove the sulfuric acid with the quantity of barium carbonate theoretically necessary, and that even with larger quantities of this substance only a small part of the said acid can be removed.

The object of the present invention is to completely remove the sulfuric acid present in combination as well and that by a continuous process. The said process is based on the fact that barium carbonate reacts with sulfuric-acid compounds, but is otherwise entirely or almost entirely insoluble in water.

A fairly large quantity—*i. e.*, an excess—of pulverized barium carbonate is put into a tank filled with water and through this pulpy mass water is continually passed so long as all the sulfuric acid is still separated out from the same. As the said pulpy mass is contained in a tank which is fairly large in cross-section, so that the said mass forms a bath through which the water is passed, there is no fear of washing away or choking.

In order to adapt the process for use in the case of feed-water for boilers, the fact must be taken into consideration that besides the sulfuric acid the calcium and magnesium bicarbonate must be separated out. This can be effected, according to a well-known method, either by boiling or by the addition of suitable chemicals, especially quicklime.

In using chemicals it must be borne in mind that calcium and magnesium carbonates are formed from the calcium and magnesium bicarbonates as sludge. If, therefore, the water were treated simultaneously with barium carbonate and with the chemicals required to remove the calcium bicarbonate, the calcareous sludge would get into the barium-carbonate bath, which, particularly when calcium hydrate is used and when much calcium bicarbonate is present in the water, would unnecessarily choke the barium carbonate with sludge and reduce its effect, for calcium-carbonate sludge would be twice introduced. A similar state of things also arises when the water is boiled instead of being treated with chemicals. It is thus necessary to remove the calcium carbonate from time to time. In removing the same, either by drawing off through a sludge-cock or by washing out a filter used, some barium carbonate would escape and be lost. Hence, in accordance with the present invention, the process with regard to its employment for boiler feed-water is so carried out that the necessary filtration is effected separately, once in order to keep the barium carbonate back in the bath and a second time to remove the lime precipitated out.

This process can be carried out in various ways. Either the water to be purified is first passed through the barium-carbonate bath and then filtered in such a way that the barium carbonate can always get back into the bath and calcium hydrate then added, or the water is boiled instead and the calcareous sludge filtered off, or the process can be reversed, the calcium bicarbonate being first removed by means of calcium hydrate, &c., and filtration and the water being afterward passed through the barium-carbonate bath and filtered.

What I claim as my invention, and desire to secure by Letters Patent of the United States of America, is—

The process for the removal of sulfuric acid from water consisting in continually passing the water through a pulpy mass of pulverized barium carbonate, as and for the purpose set forth.

In testimony whereof I have signed my name to this specification in the presence of two subscribing witnesses.

HANS REISERT.

Witnesses:
JOH. SCHOLZ,
CARL SCHMITT.